Oct. 13, 1970  C. W. JOHNSON  3,533,610
APPARATUS FOR THE HEAT TREATMENT OF COMMINUTED MATERIAL
Filed July 11, 1968  4 Sheets-Sheet 1

INVENTOR.
Charles Wayne Johnson
BY
Van Valkenburgh & Lowe
ATTORNEYS

INVENTOR.
Charles Wayne Johnson

United States Patent Office 3,533,610
Patented Oct. 13, 1970

3,533,610
APPARATUS FOR THE HEAT TREATMENT OF COMMINUTED MATERIAL
Charles Wayne Johnson, Dallas, Tex.
(16550 Hemlock Circle, Fountain Valley, Calif. 97208)
Filed July 11, 1968, Ser. No. 744,046
Int. Cl. F27b 3/22
U.S. Cl. 263—21
10 Claims

ABSTRACT OF THE DISCLOSURE

A direct fired furnace for comminuted material, formed as a downwardly inclined tube. Tangentially directed air flow conduits supplement the burner at the head of the furnace to swirl the flame in the furnace to permit the combustion gases to mix and transport the material therethrough. The furnace discharges into an annealing tank and a vacuum blower, in the discharge line from the annealing tank, serves to regulate the flow of air and gas through the furnace and tank. Upon discharge from the annealing tank the comminuted material is collected in a separator. Perlite, vermiculite and the like may be expanded in the furnace, while the furnace itself may be used to kill weed seeds in soil.

---

This invention relates to apparatus for the heat treatment of comminuted material, and more particularly to apparatus for the heat treatment of comminuted material by direct firing, that is, by exposing the same to the combustion gases of a furnace.

The primary object of the invention is to provide a novel and improved apparatus for the heat treatment of comminuted material in a direct fired furnace, wherein the movements and currents of the hot combustion gases within the furnace are directed to mix and transport the material through the furnace and, at the same time, to effectively heat and process each particle of the material.

The heat treatment of comminuted material by direct exposure to a combustion gas is useful in producing physical reactions to the material, especially in expanding, exfoliating or intumescing the particles thereof. Such heat treatment may also be useful in producing chemical reactions, such as calcining, oxidizing or reducing, and engendering solid state reactions. The present invention concerns apparatus for treating comminuted material in a direct fired furnace, and is useful for processing a number of different types of materials for different purposes where the particles of the material are sufficiently small and light in weight as to permit them to be lifted, mixed and agitated by a current of air or gas. Accordingly, this apparatus is especially suitable for use with materials such as perlite and vermiculite which expand or exfoliate when heated, to become lightweight, fluffed particles.

Perlite, which is used extensively as a lightweight aggregate, is a general term to describe several types of volcanic rock containing a small percentage of water. When sufficient heat is properly applied to small particles of such rock, the rock softens and the particles expand to small glass-like bubbles which retain their form when subsequently cooled. Although a number of different rock minerals may be used to form various types of perlite. the process of treating the raw material is essentially the same for each type. First, the raw material is ground and classified to a selected size range and it is then heated to a temperature which will vary from 1,400° F. to 3,500° F., depending upon the type of material used.

Vermiculite, which is also used extensively as a lightweight aggregate and as a filler, is any of a number of micaceous minerals which are hydrous silicates. When sufficient heat is applied to small particles of such minerals, they exfoliate by separation and expansion of the book-like micaceous flakes making up the particles. The process of treating the raw material is essentially the same as for perlite. The raw material is ground or crushed to a selected, classified size and then heated to a temperature in the range of 2,000° F. to effect the exfoliation.

Two basic furnace types have been developed for the treatment of perlite and vermiculite. The first is a horizontally disposed, direct fired, rotary kiln wherein the flame of the furnace will move the perlite or vermiculite particles out of the furnace as they are expanded. The other type is a vertical, tubular furnace wherein the particles may fall to be heated by the rising flame within the furnace. The horizontal, rotary kiln has the disadvantage of moving parts and also, when perlite is being treated, the disadvantage of having the glass-like particles lie together in such a manner as to permit a certain amount of the particles to congeal when they are heated to a softening temperature, and especially if the furnace becomes overheated. The vertical kiln has the disadvantage of using an excess of fuel and of permitting the particles to fall through it at too rapid a rate and especially, when it is being used to treat material which has variable sized particles, for then the heavier particles of the raw material will drop through the furnace without being propertly heated.

Moreover, these basic furnace types, when designed for one type of material, are not easily adapted to be used for the heat treatment of other and different types of material. For example, a rotary kiln designed to exfoliate vermiculite cannot be easily modified to heat treat a mixture of comminuted materials to produce solid state reactions. One need for solid state reactions occurs where a silicate ore is combined with a solubilizing reagent, such as sodium hydroxide or sodium carbonate, to condition the ore so that it may be subsequently dissolved or otherwise treated. The solid state reaction may be accompanied by intumescence, a melting and frothing of the reagents, which, when heated, may congeal into a solid mass which will have to be reground before the material can be further processed.

The present invention was conceived and developed to provide for a more versatile type of apparatus for the heat treatment of comminuted material, and comprises, in essence, an elongated, downwardly inclined furnace exiting into an annealing tank. Comminuted material is subjected to a swirling flame at the head of the furnace and a rotating or vortex action of the combustion gases as they move down the furnace. This movement of the gases will effectively stir and transport the material particles in such a manner as to minimize adhesion to each other and to expose each particle to the action of heat to complete their treatment before being discharged from the furnace and into the annealing tank.

It follows that another object of the invention is to provide a novel and improved apparatus for the heat treatment of comminuted material wherein the combustion gases are rotated to produce a vortex-like action as they pass through the furnace to lift, suspend and transport the particles of the material being heat processed.

Another object of the invention is to provide a novel and improved apparatus for heat treatment of comminuted material which may be easily and quickly adapted and adjusted to properly handle and treat various types of material.

Another object of the invention is to provide a novel and improved apparatus for the heat treatment of comminuted material which provides for a simple, versatile arrangement for any selected annealing treatment of the material after it is expelled from the furnace to permit the same to be cooled slowly or suddenly.

Other objects of the invention are to provide a novel and improved furnace for the heat treatment of comminuted material which is a simple, low cost structure having no moving parts in the furnace itself, and which is a rugged, durable and versatile unit.

With the foregoing and other objects in view, all of which more fully hereinafter appear, my invention comprises certain constructions, combinations and arrangements of parts and elements as more fully hereinafter described, defined in the appended claims and illustrated in the accompanying drawings, in which:

Figure 1:
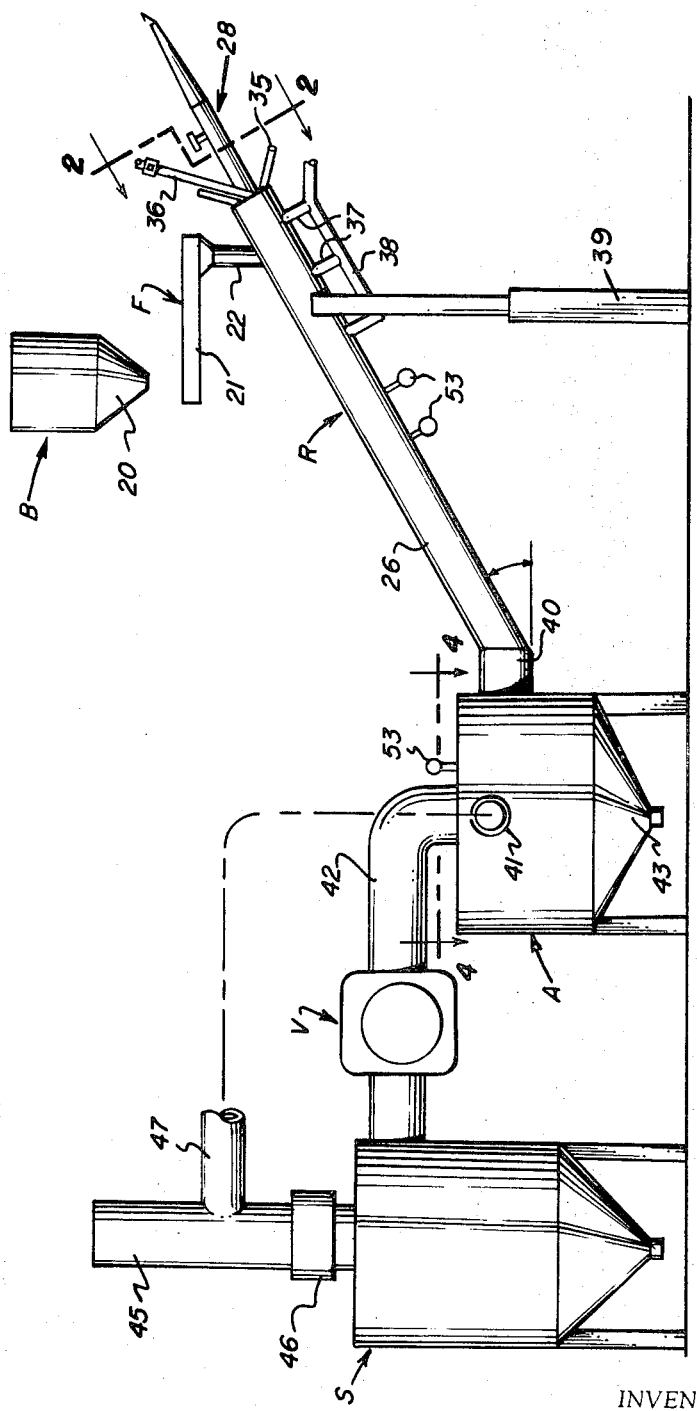
FIG. 1 is a somewhat diagrammatic side elevational view of an arrangement of an apparatus which incorporates in its components the principles of the present invention.

Referring more particularly to the drawings, FIG. 1 illustrates the basic components of a complete heat treating plant for comminuted material. By simple adjustments, as hereinafter described, the plant can heat the material according to any selected procedure, as will be hereinafter described. The components of this plant will include a storage tank or bin B wherein a supply of prepared, comminuted material is retained and dispensed to the furnace. A feeder F receives the material from the storage bin B and is adapted to move a steady stream of material into a reactor furnace R. This reactor furnace R is a tubular, inclined structure adapted to receive the comminuted material at its upper head section to permit a general downward flow of material through it while the material is being heated. The furnace exit at the bottom end is connected to an annealing tank A whereinto the treated and processed material is discharged either for quick or slow cooling.

The material is removed from the annealing tank by a vacuum blower V which is illustrated as being located in the discharge line from the annealing tank. This blower is adapted to impose a partial vacuum in both the annealing tank and in the furnace to not only maintain a high velocity air flow through the system sufficient to move material, but also, to facilitate the desired treatment operations where a glass-like material is being expanded. The discharge line from the annealing tank A is directed to a separator S which functions to collect the treated and cooled, or partially cooled, comminuted material and to release air and the spent gases from the furnace. It is to be noted that the material is moved through the heat treating plant entirely by the flow of combustion gas and air mixed therewith, and also, that this flow of gas and air is used as an agency for mixing and agitating and holding the particles apart during heating to produce a uniform, properly treated final product.

Regardless of the type of comminuted material to be treated, it ordinarily will be prepared by crushing the ore or raw material and then grinding it to a selected fineness, unless already in a finely divided state. It is then dried and classified to a selected size range. For example, it may be desirable to have the material sized to pass a 50 mesh screen, but be retained upon a 100 mesh screen. The bin B wherein this material is stored is illustrated diagrammatically at FIG. 1, since it is a conventional unit. Accordingly, it may be of any suitable construction and size, and will incude a conventional type of discharge spout 20 from whence the material will flow whenever a gate in this spout, not shown, is opened. Preferably, the bin will be supported above the other apparatus in any suitable manner, to provide for a gravity flow of material and it must be sufficiently tight as to keep the material within it dry and freely flowable. Provision to preheat the comminuted material may also be desirable, to have the ground material at a partially elevated temperature as it flows into the furnace. This preheat operation may be accomplished by conventional means, not shown.

The flow of material from the discharge spout 20 is further regulated by the feeder F which provides a continuous, metered flow to the head of the furnace in order to maintain a maximum efficiency of operation. The construction of this feeder is not shown in detail because it may be any one of several conventional types available. One type of feeder moves the material with a lead screw, while another type moves the material with vibrational impulses, and either can be used. Regardless of the type, it is to be noted that it will include a comparatively level section 21 across which the material is moved and a downspout feed 22 at its terminus which is directed into the reactor furnace R near the head end of the furnace.

Figure 2:
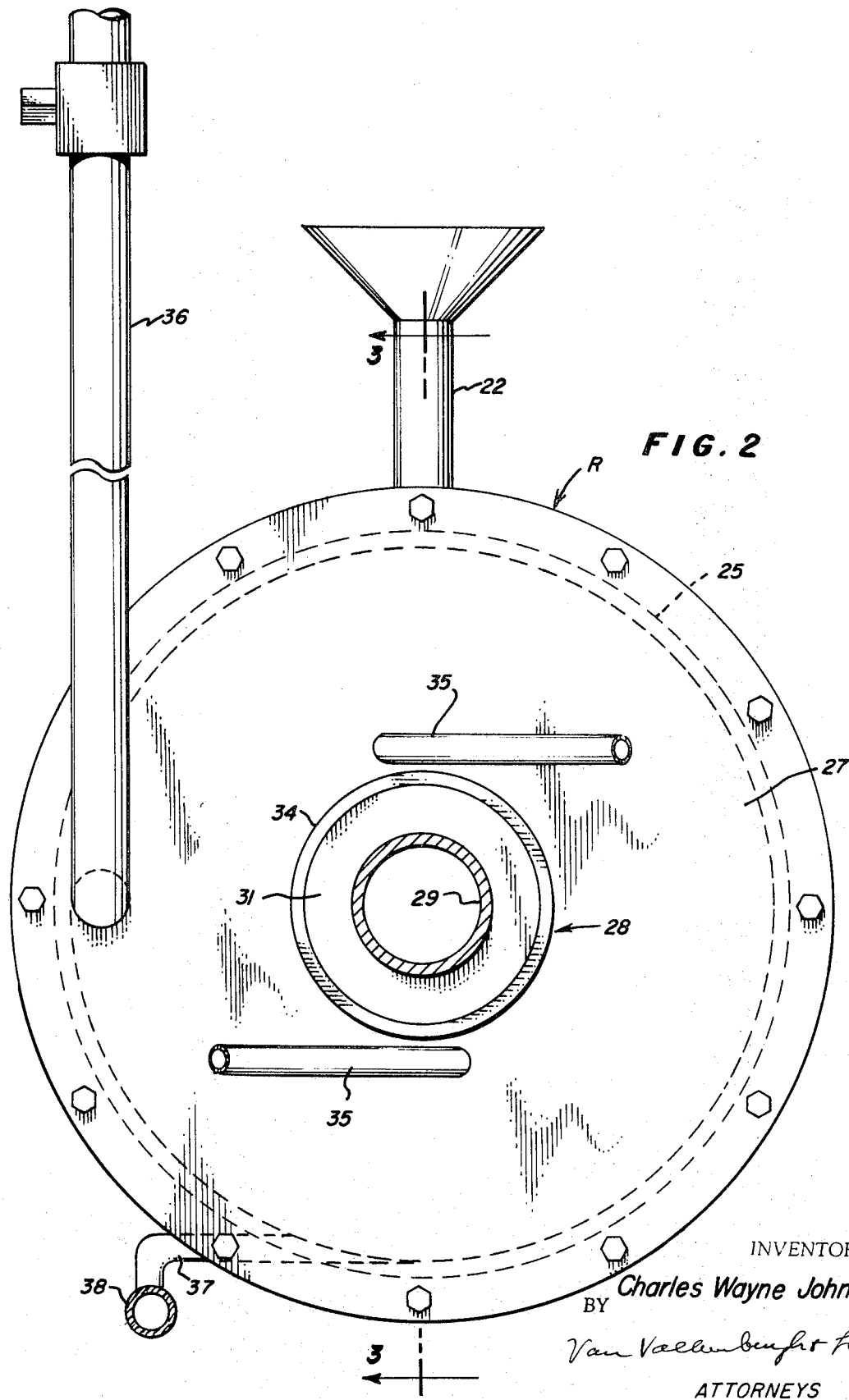
FIG. 2 is an end view of the intake or head of the furnace component of the apparatus, as taken substantially from the indicated line 2—2 at FIG. 1, but on an enlarged scale.
Figure 3:
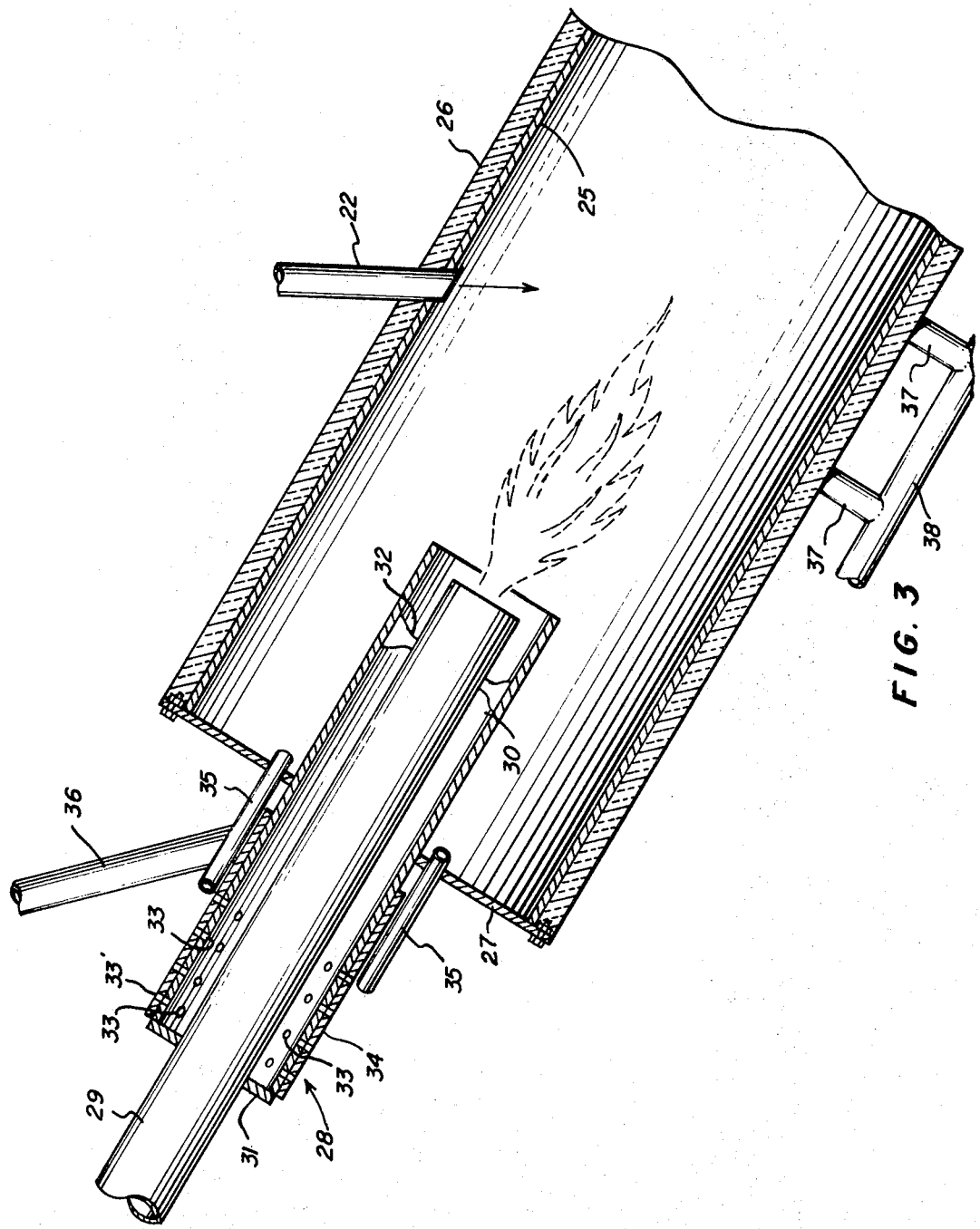
FIG. 3 is a longitudinal sectional view of the intake or head section of the furnace as taken from the indicated line 3—3 at FIG. 2, but on a slightly reduced scale, with the unit illustrated as being inclined as to a position for its normal use, and with a flame being indicated therein in a somewhat symbolic manner.

The reactor furnace R is illustrated at FIGS. 1, 2 and 3 and the inventive concept herein disclosed includes not only the combination of this furnace with other components described, but also, the construction of the furnace per se. This reactor furnace R is formed as an elongated, cylindrical tube 25 which is covered with an insulation layer 26. The tube is preferably a metal cylinder, such as stainless steel, which will withstand the high temperatures to which it is subjected, and at the same time will be inert to oxidizing or reducing reactions of hot gases within it. Also, the interior wall of this tube 25 is smooth surfaced to prevent the comminuted material from adhering to it and to better permit the material to swirl and mix within it, as will be hereinafter described.

The head of the furnace tube is enclosed by a disc-shaped lid 27 which carries a tubular, axially centered burner 28. This burner is adapted to inject an intensely hot flame into the furnace tube and includes a fuel gas supply pipe 29 of a suitable size which is axially mounted within an air feed tube 30 as illustrated at FIG. 3. The tube 30 extends through and is carried on the lid 27 in an approximate centered position with one portion projecting into the furnace and the other portion projecting outwardly therefrom. The gas pipe 29 is connected with a valve controlled feed line in any suitable manner, not shown. It extends partially into the air feed tube 30 from the back of the furnace through the center of a disc 31 on the outer end of the tube 29 and is held therein, in an axially centered position, by the disc 31 and by a spider 32 within the tube.

This outward portion of the air feed tube 30 includes an array of air intake orifices 33 which may be covered by a control sleeve 34 rotatably mounted over the tube 30. The sleeve 34 has orifices 33' which register with the orifices 33 whenever the sleeve is rotated to a full draft position as shown. The sleeve may be rotated slightly to move the orifices 33' out of, or partially out of, registration with the orifices 33 to reduce the draft, and it is contemplated that a minimum amount of air will be supplied to the furnace by these orifices.

In addition to the air which is supplied through the orifices 33 in the tube 30, additional amounts of air are fed to the furnace by feed pipes which are arranged to swirl the air flow. A first supplemental pair of air feed pipes 35 is mounted in the lid 27 alongside the air feed tube 30 at diametrically opposing, inclined positions to initiate a rotative swirl of air flow at the head of the furnace. A second supplemental air feed pipe 36 is also mounted in the outward portion of the lid 27, adjacent to the interior wall of the furnace tube 25 and at an inclination corresponding with that of the tubes 35. Air flow into the feed pipe 36 will supplement and enhance the swirling air flow action created by the pipes 35.

A third group of supplemental air feed pipes 37 is mounted in a longitudinal array along the furnace tube 25 and these pipes are directed tangentially into the reactor tube 25 in a direction corresponding with that of the tubes 35 and 36 to further enhance the swirling action of the air at locations beyond the head of the furnace. Preferably, these longitudinally disposed air feed pipes 37 are located at the underside of the furnace tube 25, as illustrated, not only to enhance the swirling action of the gases and of the charge within the furnace, but also, to facilitate lifting the charge of comminuted material from the bottom or invert of the furnace tube.

It is contemplated that the orifices 33 will provide only sufficient air to maintain combustion in the burner and that air from the supplementary pipes will be necessary to complete combustion of the gas within the furnace. These supplementary air feed pipes 35, 36 and 37 may receive air directly from the atmosphere since the interior of the furnace will be under a vacuum as hereinafter described. However, the air lines may be connected to a manifold such as the manifold 38 shown connecting the group 37 to supply the same under pressure. As a further refinement, the air supplied to these supplementary feed pipes may be preheated and under pressure in any suitable manner, not shown.

The desired action of heating the comminuted material involves dropping the material from the feed spout 22 into the reactor tube 25 at a location where it may fall into the flame as it flows from the burner 28 as illustrated at FIG. 3. This will commence the treatment of the particles. It continues for a short time period for combustion of the gas supplied from the line 29 will be completed by a flow of air from the supplementary feed pipes 35, 36 and 37. At the same time, the tangential component of the inflow of air from these pipes will effect a rapid swirl of gas in the reactor tube 25 which will effectively mix and expose all of the comminuted particles to the action of the flame and at the same time, will slow down the movement of particles through the furnace.

It is manifest that the size of the reactor tube 25 can easily be correlated with the size of the burner and the size of the supplementary feed pipes to properly heat treat any specified flow of comminuted material through the furnace. Also, to supplement these factors, the reactor tube is inclined downwardly at a selected angle to better handle a given flow of a selected material, for the downward tilt of the furnace has the effect of reducing the tendency of material to lie on the bottom of the furnace, and to better permit the swirl of furnace gas to lift the material. A desirable angle of inclination has been found to be approximately 25 degrees, but the same can be effectively and advantageously varied from 10 to 45 degrees. It was found that the flatter inclinations would tend to pile up heavier materials, but steeper inclinations would cause the material to literally drop through the furnace at too rapid a rate to be effectively heated. To provide a versatile unit, the furnace may be tilted at any angle, and the structural support for the furnace may include an adjustable support leg 39 which will hold the tube at any selected inclination.

The lower, discharge end of this furnace R is directed into an annealing tank A which is adapted to cool the material either slowly or rapidly. This tank A is a closed structure of any suitable form such as the upright cylindrical form illustrated. It will include an intake 40 formed as an elbow-like stub connecting with the lower end of the tube 25 of the reactor furnace. The intake elbow will be adjustable when a means for adjusting the inclination of the tube is provided. The intake 40 is shown as being mounted in the cylindrical wall of the tank in a radial manner which directs the discharge from the furnace toward the center of the tank so that the material being discharged into it from the furnace will not ordinarily swirl, but will be agitated considerably. The heat application of the comminuted material is completed when the material enters this tank, and when perlite is being expanded, it will be a myriad of lightweight froth or bubbles. These bubbles are formed at a temperature which softens them and they must be cooled below their softening temperature to prevent them from adhering to each other. They will easily move through an annealing tank responsive to the agitation of air currents within the tank and the annealing operation is effected by admitting additional amounts of cooler air into the tank. Accordingly, the annealing tank A will ordinarily be substantially larger than the diameter of the furnace tube 25 to receive the additional volume of air. The air flow into the tank, which will stir and agitate the particles, is supplied by a side line 41 which is preferably directed into the tank at right angles and to the intake 40 to provide an effective churning of the two air streams as they are intermixed. A discharge line 42 extends from the top of this annealing tank A and includes the vacuum blower V to be directed thence to the separator S as will be described.

Additional features of the annealing tank include a funnel-like outlet at its base to receive heavy particles which will not pass through the blower V, and a side inflow line 44 wherein small amounts of water or gas may flow to accelerate the cooling action when necessary.

The vacuum blower V is of any conventional type which will pass the treated particles of comminuted material whenever it is mounted in the discharge line 42 between the annealing tank and the separator S. Such a blower may be a conventional, propellor type where the churning of propellors in the line 42 forces a movement of gas and air through the line. It must also be of a type which will withstand comparatively high temperatures. Should the vacuum blower V be of a positive displacement type, it may be undesirable to have particles in the air blast move through it. It must then be mounted in the discharge line of the separator S at a location where the air is sufficiently clean as to not create jamming or undue wear in the pump.

The separator S is illustrated diagrammatically at FIG. 1 and as a cylone type, and as such, need not be described in detail since such separators are well known to the art. Basically, the cyclone separator is formed at a vertically disposed cylindrical tank having a conical base. The discharge line 42 of the annealing tank forms the intake of this cyclone and it enters the same tangentially near the top of the tank. The air blast therein forms a vortex with the particles being thrown against the tank walls by centrifugal force and the air freed of the particles discharges upwardly through an axially centered discharge stack 45. A filter bank 46 may be mounted in the stack to collect and return any particles which are carried out of the tank by the dischaging blast of air and combustion gas. The stack 45 will include a bypass 47 which connects to the inlet 42 of the annealing tank as hereinafter described.

Figures 4, 5:
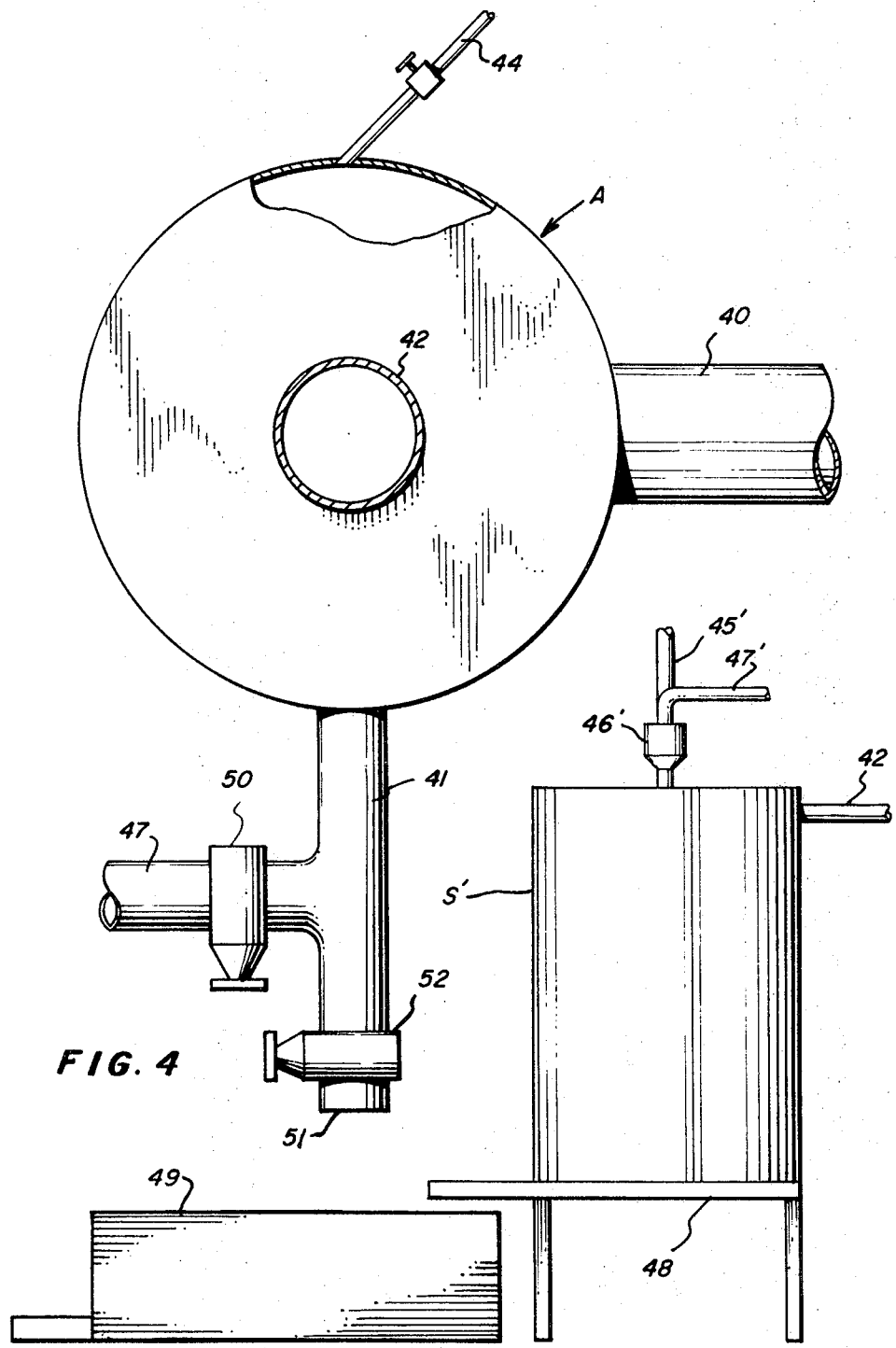
FIG. 4 is a plan view of an annealing tank used in the apparatus, as taken substantially from the indicated line 4—4 at FIG. 1, but on an enlarged scale, and with portions of the same being broken away to show constructions otherwise hidden from view.
FIG. 5 is a side elevational view of a separator component which is an alternate construction from that illustrated at FIG. 1, but on a reduced scale.

FIG. 5 illustrates an alternate form of a separator S' which is formed as a large settling tank. The discharge line 42 enters this tank S' near its top and the material ejected into the tank will drop to the bottom of the tank permitting the air and furnace gas to be discharged through a line 45' at the top of the tank. This line 45' may include a cyclone separator or filters 46' to eliminate the very fine particles of dust which will not settle within the tank S'. It is to be noted that these very fine particles of dust which are caught in the filter 46' may be returned to the tank or may be otherwise disposed of if it becomes desirable to classify the material within the tank S'. As the material settles within this tank S', it may be removed therefrom as by a feed screw 48 at its base, to be directed into a classifier 49 or any other suitable control container.

The annealing of different materials for different purposes will involve, generally, an operation of slowly or rapidly cooling the treated particles depending upon the material used and the results desired. With some types of volcanic glasses, the operation of suddenly chilling the particles will cause them to shatter and for some products, such as perlite, this is to be avoided while for other products, this is desired.

The present apparatus presents an ideal arrangement for producing any selected anneal operation through the simple expedient of recirculating the gases discharged from the separator S after the treated particles are removed. Whenever a slow cooling is desired, the bypass 47 of the discharge line 45 from the separator is connected directly to the side line 41 of the annealing tank. A valve 50 in the line 47 controls the flow of air through the line 47. The side line 41 also opens to the air as at an end 51 and a valve 52 controls the flow of air into the annealing tank A. The temperature or air entering the annealing tank A through the side line 41 is comparatively hot when the valve 50 of the line 47 is open and the valve 52 is closed and approaches the temperature of the gases entering the intake 40. By opening the valve 52 and closing valve 50 to permit some air at ambient temperature to enter this side line 41, the temperature drop in the annealing tank will be comparatively sudden and cooling of the material rapid. By partially opening these valves and thus regulating the amount of separator discharge air and ambient air to be mixed in the side line 41, any desired cooling temperature of the material within the tank can be obtained.

To complete the apparatus, suitable control gages 53 are located in the furnace reactor tube and in the annealing furnace so that the amounts of fuel and air and the rate of feed can be effectively regulated for operation. The actual operation will commence by initiating the heating and blowing operations and thereafter a flow of comminuted material will be moved through the apparatus and gradually increased until the apparatus operates at its peak efficiency. Such adjustments, as the amount of gas in the furnace and the angle at which the furnace is tilted, can easily be made by the operator as he observes the production of the final product at the cyclone separator. When a glass-like material, such as perlite, is moved through the apparatus, it may be desirable to cool the particles in the annealing tank only sufficiently as to permit them to retain their individual form. However, where a material such as vermiculite, which has a high melting point, is moved through the furnace, the cooling may be comparatively rapid. A still more rapid cooling of the material can be effected by supplying a spray of water into the tank from the line 44.

The reactor R may be used individually and may also be made portable, but preferably equipped with a blower at the discharge end for reducing the pressure inside the reactor and, when desired, equipped with a dust collector or dust separator, as for the treatment of soil to kill weed seeds. With such a portable reactor, a layer of top soil several inches thick may be fed into the reactor, in which the temperature produced by hot combustion gases will be sufficient to cause weed seeds, which have moisture inside and therefore will pop open on heating, to be killed. The time during which the soil remains in the furnace should, of course, be insufficient that soil bacteria will be destroyed. The swirling and mixing action of the secondary air from tubes 35 and 36, as well as tubes 37 when used, will cause a maximum number of weed seeds to be heated sufficiently to kill the same. The soil thus treated may be discharged directly onto or closely adjacent the area from which it is removed for treatment, or the reactor may be set up in a position to minimize the transportation of soil to and from the reactor.

Such a portable reactor may also be utilized to add vermiculite to a sandy soil, which does not tend to hold water, or a clay soil which tends to pack hard, by killing weeds in one reactor tube and exfoliating unexpanded vermiculite in another reactor tube, then mixing the treated soil with the expanded vermiculite as it is replaced. Such use solves the problem of transporting the large volumes of expanded vermiculite necessary for such mixing, since only unexpanded vermiculite, having only a fraction of the volume of expanded vermiculite, need be transported to the reactor.

I have now described my invention in considerable detail. However, it is obvious that others skilled in the art can build and devise alternate and equivalent constructions which are nevertheless within the spirit and scope of my invention. Hence, I desire that my protection be limited, not by the constructions illustrated and described, but only by the proper scope of the appended claims.

What is claimed is:

1. A furnace for heat treating comminuted material, comprising:
    (a) a body structure formed as a fixed, elongated, downwardly inclined, tubular shell;
    (b) a burner at the head of the furnace adapted to eject a flame thereinto;
    (c) a means adapted to inject air into the furnace as a rotating swirl to produce a vortex-like movement of the air and combustion gases within the furnace; and
    (d) a means adapted to introduce a flow of comminuted material into the furnace near the head thereof, whereby to expose the material to the flame of the burner and to the vortex-like movement of the air therein and permit the same to mix and transport the material downwardly and through the furnace.

2. In the furnace defined in claim 1, wherein said material introducing means includes a downspout adapted to drop the material in the furnace, whereby to permit the same to fall into the blast of the furnace flame.

3. In the furnace defined in claim 1, wherein said air injection means includes a conduit directed into the head end of the furnace and inclined and offset with respect to the furnace axis.

4. In the furnace defined in claim 1, wherein said air injection means includes a conduit at the furnace wall directly substantially normal to the furnace axis and substantially tangential to the furnace wall.

5. In the furnace defined in claim 1, including an annealing tank at the furnace exit substantially larger than the furnace diameter.

6. In the furnace defined in claim 5, including a discharge line from the annealing tank and a vacuum blower in said discharge line adapted to partially evacuate the furnace and tank.

7. In the furnace defined in claim 6, including an auxiliary intake into the annealing tank adapted to permit a flow or air thereinto to mix with the combustion gas from the furnace.

8. In the furnace defined in claim 5, including a discharge line from the annealing tank, a separator connecting with the discharge line, a discharge stack on the separator and a vacuum blower in the lines adapted to create a suction in the system.

9. In the furnace defined in claim 8, including an auxiliary intake in the annealing tank to permit a flow of air thereinto to mix with the combustion gas of the furnace and a bypass line in the discharge stack connecting with the auxiliary intake.

10. In the furnace defined in claim 1, wherein the inclination of the furnace is between 10 degrees and 45 degrees from the horizontal.

References Cited

UNITED STATES PATENTS

| | | |
|---|---|---|
| 2,306,462 | 12/1942 | Moorman. |
| 2,505,249 | 5/1950 | Johnson et al. |
| 3,311,358 | 3/1967 | Wagner. |
| 3,329,418 | 7/1967 | Stephanaff. |

JOHN J. CAMBY, Primary Examiner

U.S. Cl. X.R.

252—378